Figure 6:
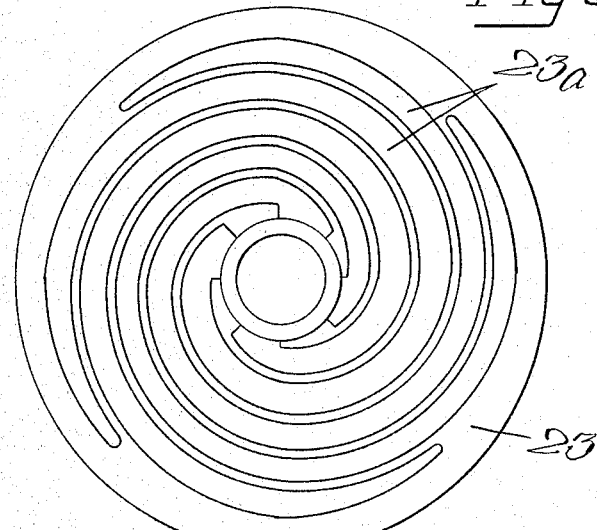
Figure 7:
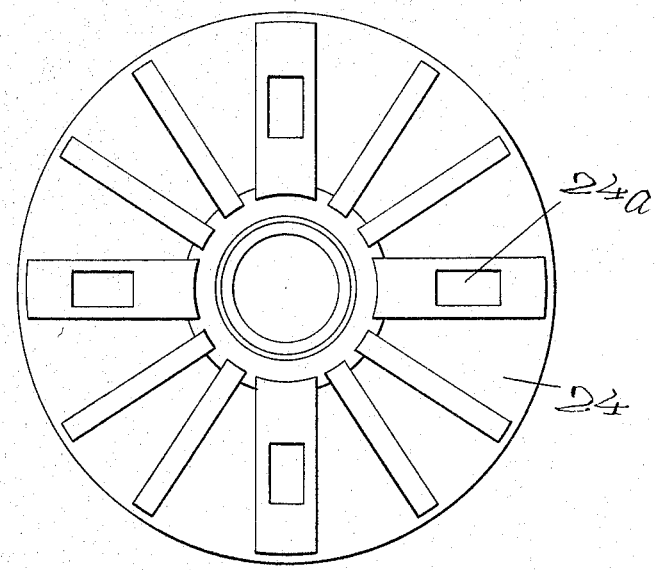

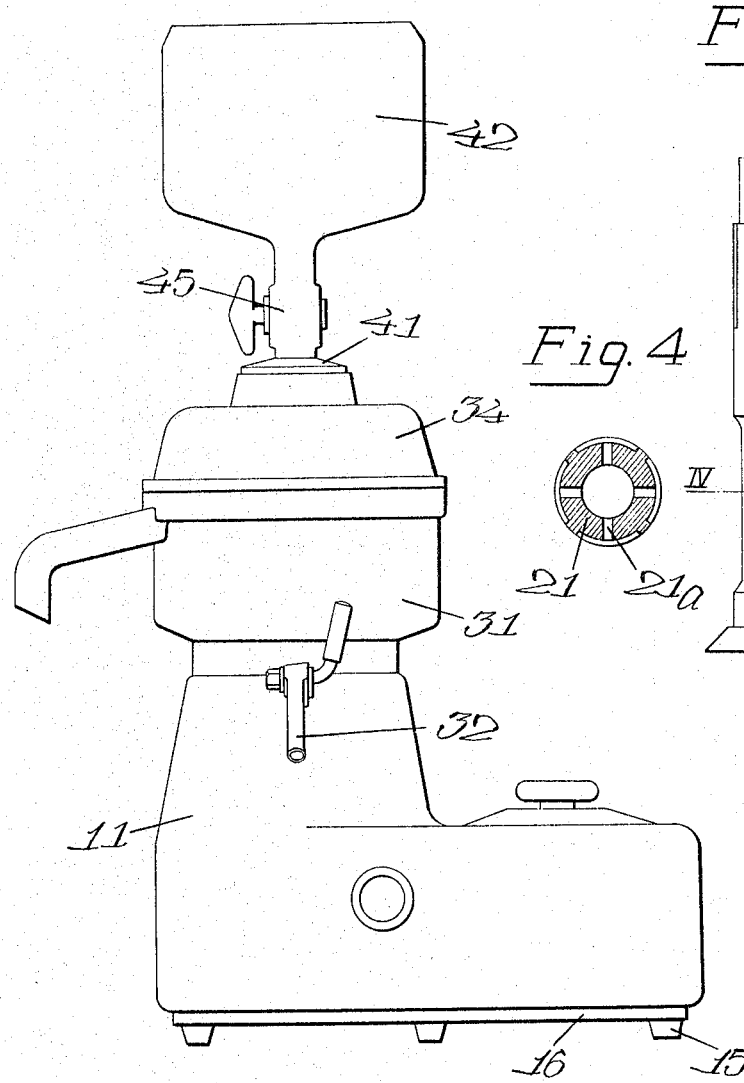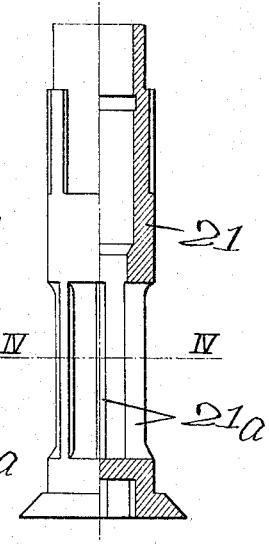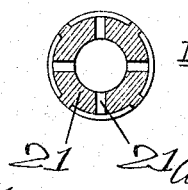

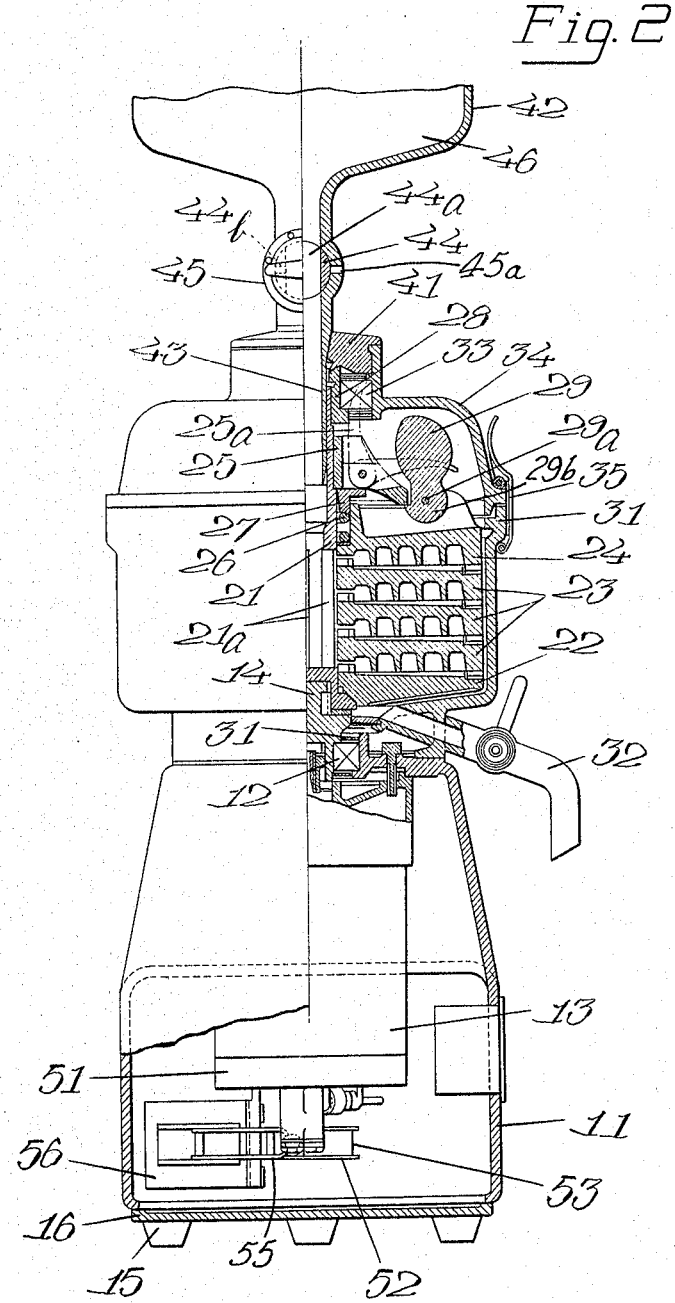

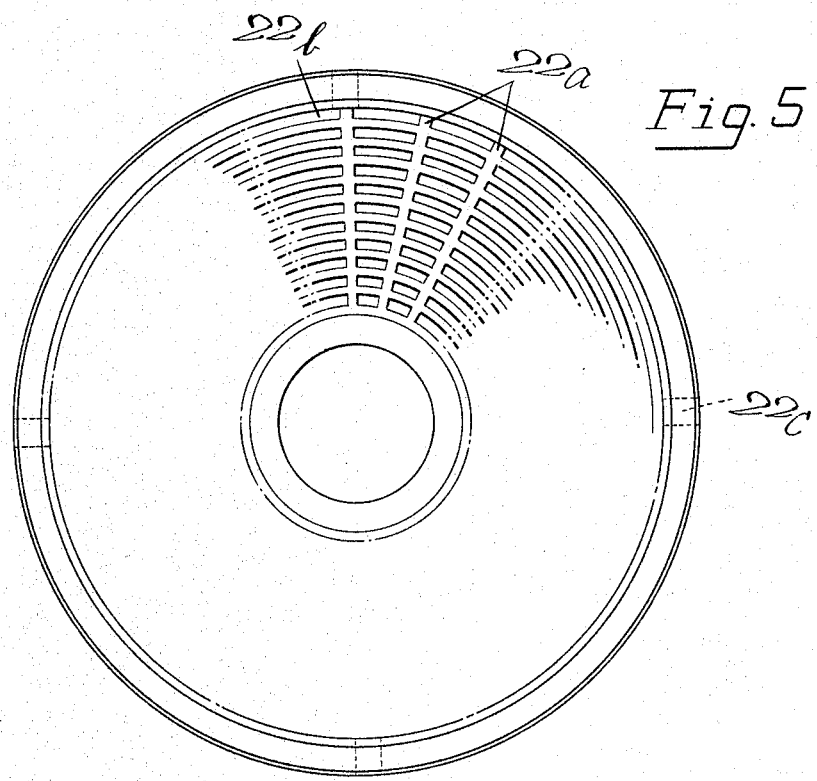
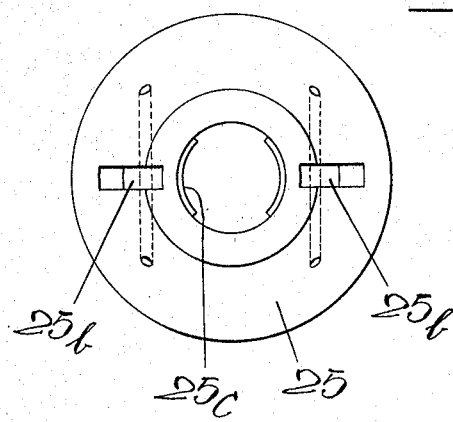

Oct. 4, 1966  SHOHACHI HIMENO  3,276,587
CENTRIFUGAL FILTER

Filed Oct. 15, 1963  7 Sheets-Sheet 4

INVENTOR:
SHOHACHI HIMENO
BY E. M. Squire
ATTORNEY.

Oct. 4, 1966   SHOHACHI HIMENO   3,276,587
CENTRIFUGAL FILTER

Filed Oct. 15, 1963   7 Sheets-Sheet 5

INVENTOR:
SHOHACHI HIMENO
BY E. M. Squire
ATTORNEY.

Oct. 4, 1966  SHOHACHI HIMENO  3,276,587
CENTRIFUGAL FILTER
Filed Oct. 15, 1963  7 Sheets-Sheet 7

INVENTOR:
SHOHACHI HIMENO
BY E.M. Squire
ATTORNEY.

3,276,587
CENTRIFUGAL FILTER
Shohachi Himeno, Tokyo, Japan, assignor to Kenichi Kido and Shohachi Himeno, both of Tokyo, Japan
Filed Oct. 15, 1963, Ser. No. 316,209
Claims priority, application Japan, Oct. 17, 1962, 37/44,934; Mar. 27, 1963, 38/13,822
3 Claims. (Cl. 210—145)

This invention relates to a centrifugal filter.

An object of this invention is to provide a centrifugal filter acquiring its filtering pressure from centrifugal force.

Another object of this invention is to provide a centrifugal filter for rapidly carrying out filtration continuously by means of a series of thin layers of filtering material.

Other objects and advantages of this invention will be apparent from the following description with reference to the drawings forming a part hereof.

Figure 9:
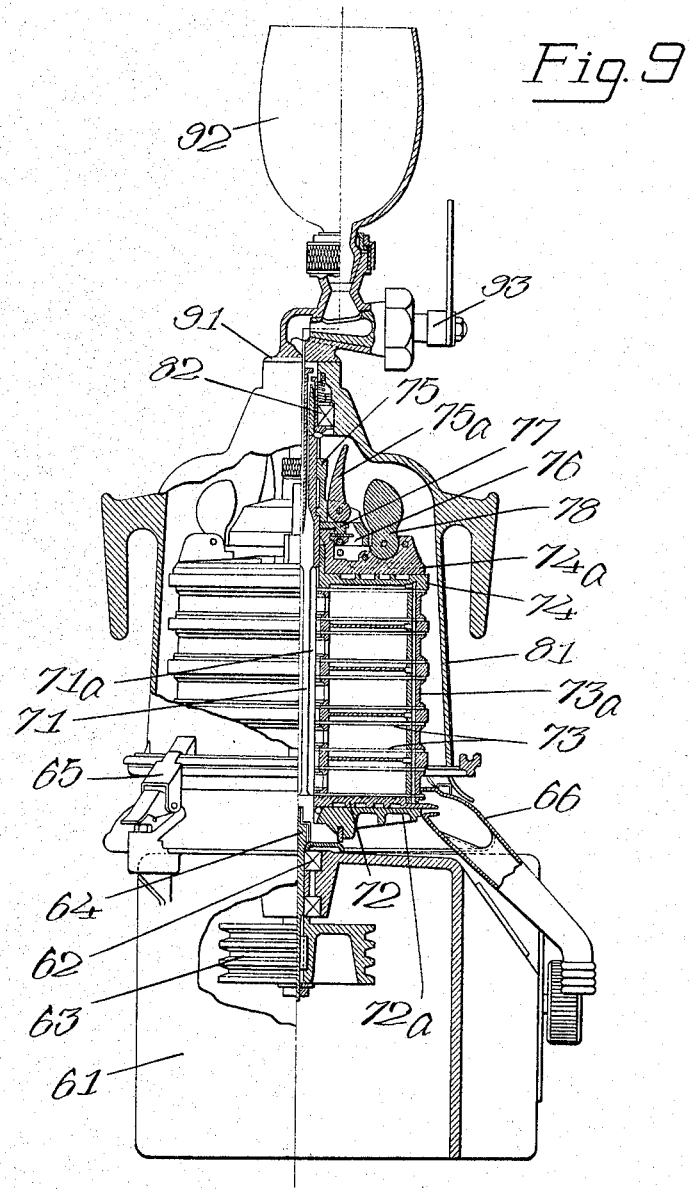
Figure 10:
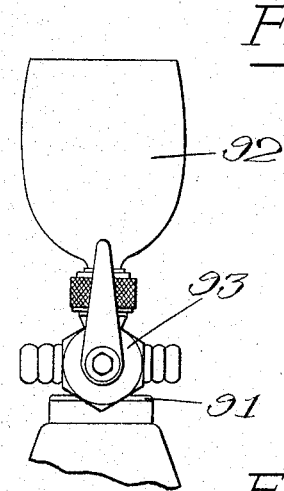
Figure 13:
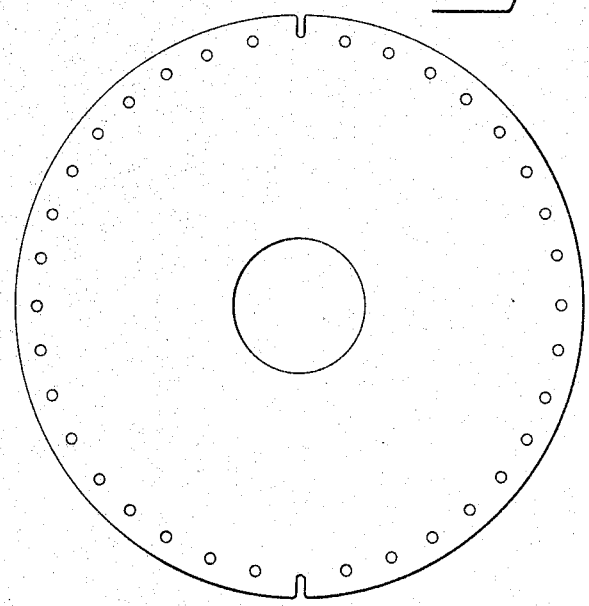
Figure 11:
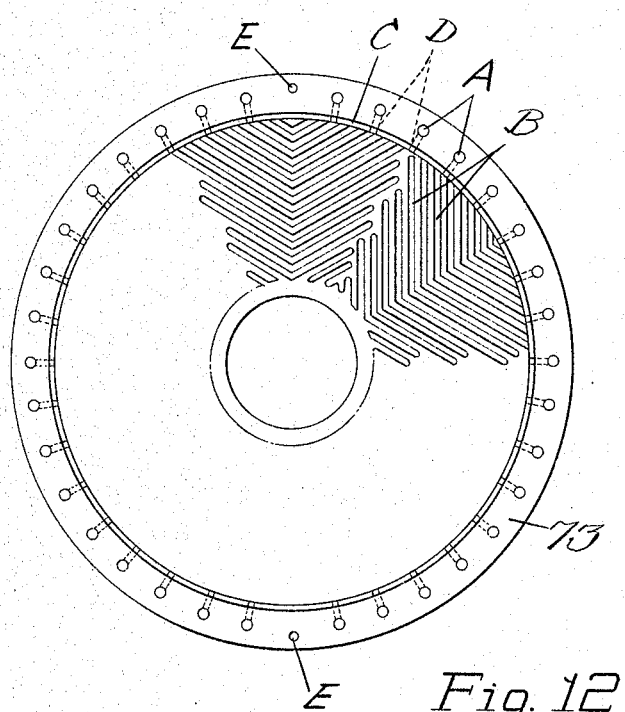
Figure 12:
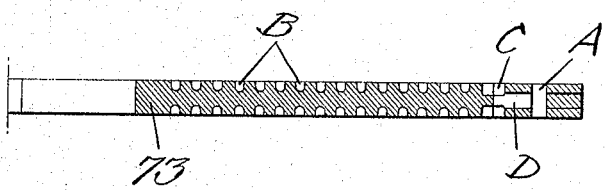

In the drawings:

FIG. 1 is a front elevation of the centrifugal filter according to this invention, FIG. 2 is a side elevation, partly in cross section, FIG. 3 is an enlarged elevational view of a vertical shaft, partially shown in cross section, FIG. 4 is a transverse section on the line IV—IV of FIG. 3, FIGS. 5, 6 and 7 represent plan views of the lowermost separating plate, an intermediate separating plate, and the uppermost separating plate respectively, FIG. 8 is a plan view of a collar, FIG. 9 is a view, partly in cross section, showing a side elevation of another embodiment of a filter according to this invention, FIG. 10 is a fragmentary view showing a reservoir in side elevation, FIGS. 11 and 12 are each a plan view and a partial cross section of an intermediate separating plate and FIG. 13 is a plan view of a filter paper for use with the apparatus illustrated in FIG. 9.

A base 11 is provided with bearings 12 supporting a vertical shaft 14 which is drivingly connected to the shaft of a motor 13. To the base 11 is also fixed a base plate 16 having rubber feet 15 thereunder. On a hollow vertical shaft 21 connected to the shaft 14 are fitted a lowermost filter member or separating plate 22, a plurality of intermediate separating plates 23 and an uppermost separating plate 24 arranged in stacked relationship with filtering paper therebetween. The upper separating plate 24 is arranged to be pressed downwardly by a collar 25 threaded on the hollow shaft 21, while between the uppermost separating plate 24 and the collar 25 are interposed a spring 26 and a spring follower 27, downward pressure being applied by means of thrust members 25a and weights 29. The base 11 is connected to a casing 31, on the bottom of which is provided an exhaust pipe 32. A cover 34 having bearings 33 which are fitted between the cover and a bearing retainer 28 mounted on the hollow shaft 21 engages an annular lip 31 by means of a shoulder 35. Through a cock 43 the hollow shaft 21 communicates with a liquid tank 42 which is fixed to the cover 34 by means of a bushing 41 and also communicates with the stacked filter members through slots 21a (refer to FIGS. 3 and 4). The lowermost filter member or separating plate 22 is provided with a number of communication grooves or distributing passages 22a, 22b on the upper side thereof, running in radial and circumferential directions, and also provided with outlets 22c extending downwardly from grooves on the circumference of the plate (refer to FIG. 5). Each intermediate filter member or separating plate 23 is provided with spiral grooves or distributing passages 23a on the underside and grooves on the upper side, similar to the distributing passages 22a, 22b on the upper side of the lowermost separating plate 22. The uppermost separating plate 24 is provided on its underside with spiral grooves similar to those on the intermediate separating plates 23, and on the upper side there are provided mountings 24a for the weights 29. Each weight 29 is pivotally mounted by a pin 29a and acts on a collar 25. The collar 25 is provided (FIG. 8) with recesses 25b for receiving pivotally mounted levers 25a and interrupted threaded portions 25c to engage the hollow shaft 21, the threaded portions 25c being arranged to be disengaged when revolved 90°. A supply reservoir designated generally as 42 consists of an insert pipe portion 43, a cock portion 45 having a cock body 44 and a container portion 46 for liquid to be filtered, the cock body 44 being provided with a main passage 44a communicating with the insert pipe portion 43 and the container portion 46 and with a passage 44b perpendicular to the main passage and communicating thereto. The passage 44b communicates with the insert pipe portion 43 when the communication of the insert pipe portion 43 and the container portion 46 stops. The cock portion 45 is provided with a communicating hole 45a so that the main passage 44a may communicate with the atmosphere. When the feeding of liquid is suspended by the cock body 44, the main passage 44a communicating the container portion 46 with the insert pipe portion 43 will revolve to communicate to the hole 45a, thus connecting the passage 44b to the insert pipe portion 43. The liquid will thereby not stagnate in the insert pipe portion 43 by the influence of the atmosphere.

A motor 13 mounted in the base 11 is fitted with a base plate 51 of a brake, where one end of a band 53 surrounding a brake drum 52 mounted on the motor shaft is fixed to a band stop and the other end fixed rigidly to a pivoted lever 55, the free end of which is pulled by an electromagnet 56. Said lever 55 is provided with a spring so that the braking is effected by pressing the brake drum 52 with the band 53 under the force of the spring. As the electromagnet 56 is energized during operation of the motor 13 and the lever 55 is pulled against the force of the spring, the band 53 does not tighten the brake drum 52 and the motor continues to run freely. When the motor stops the electromagnet 56 is not energized and the band 53 will press the brake drum 52 by the force of the spring.

The operation of the centrifugal filter according to the present invention is performed in the following way: when the motor 13 revolves and the liquid to be filtered is supplied from the reservoir 42, the liquid flows into the hollow shaft 21 which is revolving and then comes into the spiral grooves of the separating plate from the vertical slots 21a. Then the liquid is separated from the solids by filtering paper, flows downwardly into communication grooves or distributing passages and runs in the exhaust outlet, remaining in the casing 31 when the exhaust pipe 32 is closed. In this case, the greater the rotational velocity, the farther the weights 29 more radially outwardly. As one end 29b of the weight engages the collar 25, the upper separating plate 24 is pressed downwardly and thereby the contact of the separating plates is increased so as to prevent leakage of the liquid and ensure a high filtering efficiency at high speed. The filtered liquid remaining in the casing 31 is exhausted through the pipe 32.

The separated solid material is recovered by releasing the clamps 35 to remove the cover 34 and by releasing the thrust members 25a of the collar 25 to remove the spring follower 27, the spring 26, the uppermost separating plate 24, the intermediate separating plates 23 and the lowermost separating plate 22, one by one.

Reference is now made to FIGS. 9 to 13 showing another embodiment of this invention. Anti-friction bearings 62 provided in a base 61 support a shaft 64 driven by a pulley 63. A hollow shaft 71 which is connected to said shaft 64 is fitted with a lowermost separating plate 72, intermediate separating plates 73 and an uppermost separating plate 74 located along communicating grooves 71a. Each intermediate plate has filter papers on both its upper and lower surfaces and there is a series of spacer rings 73a each interposed between adjacent ones of the plates. Between the upper support 74a and the lower support 72a the several plates are combined together and the upper separating plate 74 is pressed downwardly by the collar 75 in threaded engagement with the hollow shaft 71. Between the upper support 74a and the collar 75 there are interposed a spring 76 and a spring follower 77 so as to make the cam face of the pressing means 75a on the collar 75 enabled to press the spring follower 77 and further to allow the weight 78 provided on the upper support 74a to press the collar 75 by the centrifugal force of revolution. The casing 81 which houses all of the above means, is open at its lower end and is connected to the base 61 by releasable fastening means 65 fixed thereon. The bearing 82 on the upper part of the casing 81 journals the upper portion of the hollow shaft 71. On the casing 81 is mounted a liquor tank 92 connected to a cock device 91 having four passages. The cock 93 of the cock device 91, is arranged so as to make the communication of liquor from the liquor tank to the interior of the filter, from the interior to the exterior of the filter and also from the liquid tank to the interior of the filter respectively by locating of the lever arm to the right, the left or the neutral position.

As regards the filter member or separating plates, the upper surface of the lowermost separating plate 72, the upper and under surfaces of the intermediate separating plate 73 and the under surface of the uppermost separating plate 74 are all provided with a group of distributing passages in the same manner, so that illustration is given only of the distributing passages of an intermediate separating plate 73. On the upper surface of the separating plate 73, there are provided a central hole receiving the hollow shaft 71 in the middle of the plate, a number of vertically extending holes A at the periphery of the plate, a number of distributing passages B in the middle of the plate, and peripheral annular grooves C communicating with the distributing passages B and radial passages D. The radial passages D are formed by radial bores extending inwardly from the periphery of the intermediate separating plate 73 and are plugged except for the lowermost separating plate 74. The annular spacer members 73a and the filter paper are perforated to register holes A, so that vertical outlet passages are provided which deliver filtered liquid to a discharge pipe 66.

In operation of this centrifugal filter, the pulley 63 is driven and the liquid to be filtered is fed from the reservoir 92 with the lever of the cock 93 turned vertical. In the continuous treatment of the liquor in large quantity, the lever of the cock 93 is turned to the right for inducing the liquid from the tank 92. The liquid enters the revolving hollow shaft 71, runs into the inlet chambers defined by the annular spacers 73a through the passages 71a and is filtered by passage through the filter papers. It flows along the distributing passages of the separating plate and down through the vertical outlet passages and is exhausted from the discharge pipe 66. The greater the rotational velocity, the greater will be the distance the weight 78 moves outwardly. Since the one end of the weight engages the collar 75, the upper support 74a is pressed downwardly by the action of the weights. The mutual compression between the separating plates is thereby increased and leakage of the liquor prevented. At the final stage of operation, the interior and the exterior of the filter are placed in communication with each other by turning of the lever of the cock 91 to the left and the liquor is entirely exhausted. If pulley 63 is stopped at the final stage of operation, and the fastening means 65 is released, the casing 81 together with the cock device 91 and the reservoir 92 can be removed and put aside. By releasing the pressing means 75a, the collar 75 is taken off from the hollow shaft 71 and the spacer members 73a containing the slurry are disassembled from the filter together with the separating plates and the filter paper. By providing the vertical outlet passages at the peripheries of the separating plates, undesirable foaming of the separated liquid is prevented and a direct contact between the casing and the separated liquor is avoided so that it does not require chemical resistant material for the manufacture of the casing. Moreover, it is easy to remove the cakes from the surfaces and to obtain high efficiency by high speed rotation.

Although I have described specific forms of a centrifugal filter, it wil be apparent that various changes, additions, substitutions and omissions may be made therein without departing from the spirit of this invention.

What I claim is:

1. A centrifugal filter, comprising: a housing; a vertical shaft journalled for rotation in said housing; a series of stacked filter members vertically slidably mounted on said shaft for rotation therewith; a series of filter papers each interposed between two adjacent ones of said members; means defining a first group of distributing passages extending over the under surfaces of all of said members above the lowermost member, said passages extending from said vertical shaft to the periphery of each member; means defining a second group of distributing passages extending over the upper surfaces of all of said members below the uppermost member; means for causing liquid to be filtered to flow axially of said shaft into said first group of passages and downwardly through said filter papers into said second group of passages; means for imparting rotational velocity to said stacked members; centrifugal means pressing downwardly on said uppermost member with a pressure which increases progressively with increasing rotational velocity of said stacked members; and means for withdrawing filtered liquid from said second group of passages.

2. A filter according to claim 1, wherein said first group of distributing passages is of spiral configuration.

3. A centrifugal filter comprising: a housing; a vertical shaft journalled for rotation in said housing; a series of circular stacked filter members vertically slidably mounted on said shaft for rotation therewith; means defining a group of distributing passages on the lower surface of the uppermost filter member, on both the upper and lower surfaces of each intermediate filter member and on the upper surface of the lowermost filter member; a series of annular spacer members concentric with said shaft, each spacer member being interposed between two adjacent ones of said filter members to define an inlet chamber therebetween; a series of filter papers each covering one of said groups of distributing passages; means for causing liquid to be filtered to flow axially of said shaft and to enter said inlet chambers and pass through said filter papers into said distributing passages; means defining a series of circularly spaced vertical outlet passages communicating peripherally with said distributing passages, said outlet passages extending through said spacer members and the peripheral portions of said filter members; means for imparting rotational velocity to said filter members and said spacer members; centrifugal means pressing downwardly on said uppermost filter member with a pressure which increases progressively with increasing rotational velocity of said filter members; and means for withdrawing filtered liquid from said outlet passages.

References Cited by the Examiner
UNITED STATES PATENTS

| | | | |
|---|---|---|---|
| 915,650 | 3/1909 | Anderson | 210—331 X |
| 1,269,067 | 6/1918 | Enell | 210—331 X |
| 1,726,035 | 8/1929 | Loew | 210—331 X |
| 2,341,230 | 2/1944 | Neuman | 210—377 X |
| 2,343,694 | 3/1944 | Mitchum | 210—368 |
| 2,345,014 | 3/1944 | Stamsvik | 210—492 X |
| 3,088,043 | 4/1963 | Graham | 210—368 X |
| 3,141,845 | 7/1964 | Nadherny | 210—488 X |

FOREIGN PATENTS 119,503  4/1901  Germany.

REUBEN FRIEDMAN, *Primary Examiner.*

J. DE CESARE, *Assistant Examiner.*